(12) United States Patent
Shin et al.

(10) Patent No.: US 10,844,579 B2
(45) Date of Patent: Nov. 24, 2020

(54) SCREEN DISPLAY SYSTEM AND SCREEN DISPLAY METHOD OF CONSTRUCTION EQUIPMENT

(71) Applicant: Doosan Infracore Co., Ltd., Incheon (KR)

(72) Inventors: Sung-Hyoun Shin, Seoul (KR); Hong-Cheol Yun, Guri-si (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 16/486,948

(22) PCT Filed: Feb. 20, 2018

(86) PCT No.: PCT/KR2018/002077
§ 371 (c)(1),
(2) Date: Aug. 19, 2019

(87) PCT Pub. No.: WO2018/151579
PCT Pub. Date: Aug. 23, 2018

(65) Prior Publication Data
US 2020/0011032 A1    Jan. 9, 2020

(30) Foreign Application Priority Data
Feb. 20, 2017   (KR) ........................ 10-2017-0022026

(51) Int. Cl.
*H04N 7/18*    (2006.01)
*E02F 9/26*    (2006.01)
(Continued)

(52) U.S. Cl.
CPC ................ *E02F 9/261* (2013.01); *B60R 1/00* (2013.01); *G06T 7/70* (2017.01); *H04N 5/247* (2013.01);
(Continued)

(58) Field of Classification Search
None
See application file for complete search history.

(56) References Cited

U.S. PATENT DOCUMENTS

2014/0125802 A1*   5/2014   Beckert ................ H04N 7/181
                                                                                     348/148
2017/0030054 A1    2/2017   Okumura et al.
2018/0295357 A1*   10/2018   Okumura ................ E02F 9/26

FOREIGN PATENT DOCUMENTS

KR       20110067683 A     6/2011
KR       20130077917 A     7/2013
(Continued)

OTHER PUBLICATIONS

International Search Report for related International Application No. PCT/KR2018/002077; report dated Aug. 23, 2018;(3 pages).
(Continued)

*Primary Examiner* — Peet Dhillon
(74) *Attorney, Agent, or Firm* — K&L Gates LLP

(57) ABSTRACT

A screen display system of construction equipment includes a plurality of cameras configured to generate camera image data, an AVM controller configured to generate an AVM (Around View Monitor) image data based on the camera image data and select at least one of the AVM image data and the camera image data as a first image data based on a first failure flag, an additional information synthesizer configured to output second image data based on the first image data, and a main display configured to display an image corresponding to one of the first image data and the second image date based on a second failure flag representing whether or not a failure occurs in the additional information synthesizer.

10 Claims, 13 Drawing Sheets

(51) Int. Cl.
*G06T 7/70* (2017.01)
*B60R 1/00* (2006.01)
*H04N 5/247* (2006.01)

(52) U.S. Cl.
CPC ........ *H04N 7/181* (2013.01); *B60R 2300/105* (2013.01); *B60R 2300/303* (2013.01); *B60R 2300/802* (2013.01)

(56) References Cited

FOREIGN PATENT DOCUMENTS

| KR | 20130088051 A | 8/2013 |
| KR | 20130097913 A | 9/2013 |

OTHER PUBLICATIONS

Written Opinion for related International Application No. PCT/KR2018/002077; report dated Aug. 23, 2018; (5 pages).

* cited by examiner

SCREEN DISPLAY SYSTEM AND SCREEN DISPLAY METHOD OF CONSTRUCTION EQUIPMENT

CROSS-REFERENCE TO RELATED APPLICATIONS

The present application is a National Stage of International Application No. PCT/KR2018/002077, filed Feb. 20, 2018 which claims priority to Korean Application No. 10-2017-0022026, filed Feb. 20, 2017, the disclosure of which is incorporated herein by reference.

TECHNICAL FIELD

The present invention relates to construction equipment. More particularly, the present invention relates to a screen display system and a screen display method of construction equipment capable of displaying a camera image in an emergency mode when a failure occurs in the screen display system.

BACKGROUND ART

Generally, in construction equipment such as an excavator, safety accidents may be caused if a driver cannot identify obstacles in a direction of movement, so a screen display system that can grasp the situation in front of the construction equipment as well as the rear and side may be very important factor. To this end, an AVM (Around View Monitor) system including a plurality of cameras installed in various directions of the construction equipment and displaying images captured from each camera on a screen has been researched.

The AVM system may generate AVM image data based on the captured images, and may further process the image data through various steps in order to add additional information. In this case, when a failure occurs in one of the steps, the camera image may not be provided to the user, which may cause a safety accident.

DISCLOSURE OF THE INVENTION

Problems to be Solved

An object of the present invention provides a screen display system of construction equipment machinery capable of providing a camera image to a user even if a failure occurs.

Another object of the present invention provides a screen display method of construction equipment.

However, the purpose of the invention may not be limited thereto, and may be expanded without being deviated from the concept and the scope of the present invention.

Means to Solve the Problems

According to example embodiments, a screen display system of construction equipment includes a plurality of cameras configured to generate camera image data, an AVM controller configured to generate an AVM (Around View Monitor) image data based on the camera image data and select at least one of the AVM image data and the camera image data as a first image data based on a first failure flag, and a main display configured to display an image corresponding to the first image data.

In example embodiments, the AVM controller may select the AVM image data as the first image data when the first failure flag represents a normal state, and may select at least one of the camera image data as the first image data when the first failure flag represents a failure state.

In example embodiments, the screen display system of construction equipment further include an additional information synthesizer configured to output second image data based on the first image data. The main display may display the image corresponding to the first image data when a second failure flag representing whether or not a failure occurs in the additional information synthesizer represents a failure state, and may display an image corresponding to the second image data when the second failure flag represents a normal state.

In example embodiments, the additional information synthesizer may include a gateway performing a communication control function of Serial Bus (CAN) through which the AVM control, the additional information synthesizer and the main display are connected.

In example embodiments, the screen display system of construction equipment further includes an auxiliary display configured to display an image corresponding to one of the first image data and the second image data when a third failure flag representing whether or not a failure occurs in the main display represents a failure state.

In example embodiments, the auxiliary display may display the image corresponding to the first image data when the second failure flag represents a failure state, and may display the image corresponding to the second image data when the second failure flag represents a normal state.

In example embodiments, the AVM controller may include an AVM image generator to generate the AVM image data based on the camera image data, a first image data selector to select at least one of the AVM image data and the camera image data as the first image data based on a first failure flag, and a switching circuit to determine which of the additional information synthesizer, the main display and the auxiliary display is provided with the first image data.

In example embodiments, the switching circuit may determine which the first image data is provided to, based on at least one of the first failure flag, the second failure flag and the third failure.

In example embodiments, the first image data selector may select at least one of the camera image data as the first image data when the first failure flag represents a failure state, and may select the AVM image data as the first image data when the first failure flag represents a normal state.

In example embodiments, the first image data selector may select main camera image data and auxiliary camera image data of the camera image data as the first image data when the first failure flag represents a failure state. The switching circuit may provide the main display with the main camera image data as the first image data, and may provide the auxiliary display with the auxiliary camera image data as the first image data.

In example embodiments, the AVM controller may includes an AVM image generator to generate the AVM image data based on the camera image data, a first image data generator to generate the first image data based on at least one of the AVM image data and the camera image data, and a switching circuit to determine which of the additional information synthesizer, the main display and the auxiliary display is provided with the first image data. The first image data generator may merge at least two of the camera image data to generate the first image data when the first failure flag represents a failure state, and may determine the AVM image data as the first image data when the first failure flag represents a normal state.

According to example embodiments, a screen display method of construction equipment includes receiving camera image data, generating an AVM image data based on the camera image data in an AVM controller, selecting and outputting at least one of the AVM image data and the camera image data as a first image data based on a first failure flag representing whether or not a failure occurs in the AVM controller, and displaying an image corresponding to the outputted first image data. At least one of the camera image data is selected as the first image data when the first failure flag represents a failure state, and the AVM image data is selected as the first image data when the first failure flag represents a normal state.

In example embodiments, the method may further include outputting second image data based on the first image data in an additional information synthesizer, and selecting and outputting one of the first image data and the second image data as an output image data based on a second failure flag representing whether or not a failure occurs in the additional information synthesizer. The first image data may be selected as the output image data when the second failure flag represents a failure state, and the second image data may be selected as the output image data when the second failure flag represents a normal state.

In example embodiments, the image corresponding to the outputted first image data may be displayed in an auxiliary display when a third failure flag representing whether or not a failure occurs in the main display represents a failure state, and may be displayed in the main display when the second failure flag represents a normal state.

In example embodiments, the AVM controller may generate and output at least one of the camera image data as the first image data when the first failure flag represents a failure state.

In example embodiments, the AVM controller may generate at least one of the camera image data as the first image data such that the image is displayed in the main display, and at least one of the camera image data which are not included in the first image data may be displayed in the auxiliary display.

Effects of the Invention

According to example embodiments, even though a failure occurs in a portion of a screen display system in a process which processes an image captured by a camera and provides to a user, image data may be processed through a different route (that is, operates in an emergency mode) such that the captured image or the processed image are provided to a user.

According to example embodiments, the image captured by the camera or the processed image may be provided to the user through a general route (that is, normal mode) as well as an emergency route (that is, emergency mode), and thus, reliability of the screen display system of construction equipment, and stability of the construction equipment may be improved and safety accidents may be prevented.

However, the effect of the invention may not be limited thereto, and may be expanded without being deviated from the concept and the scope of the present invention.

BEST MODE FOR CARRYING OUT THE INVENTION

Figure 1:
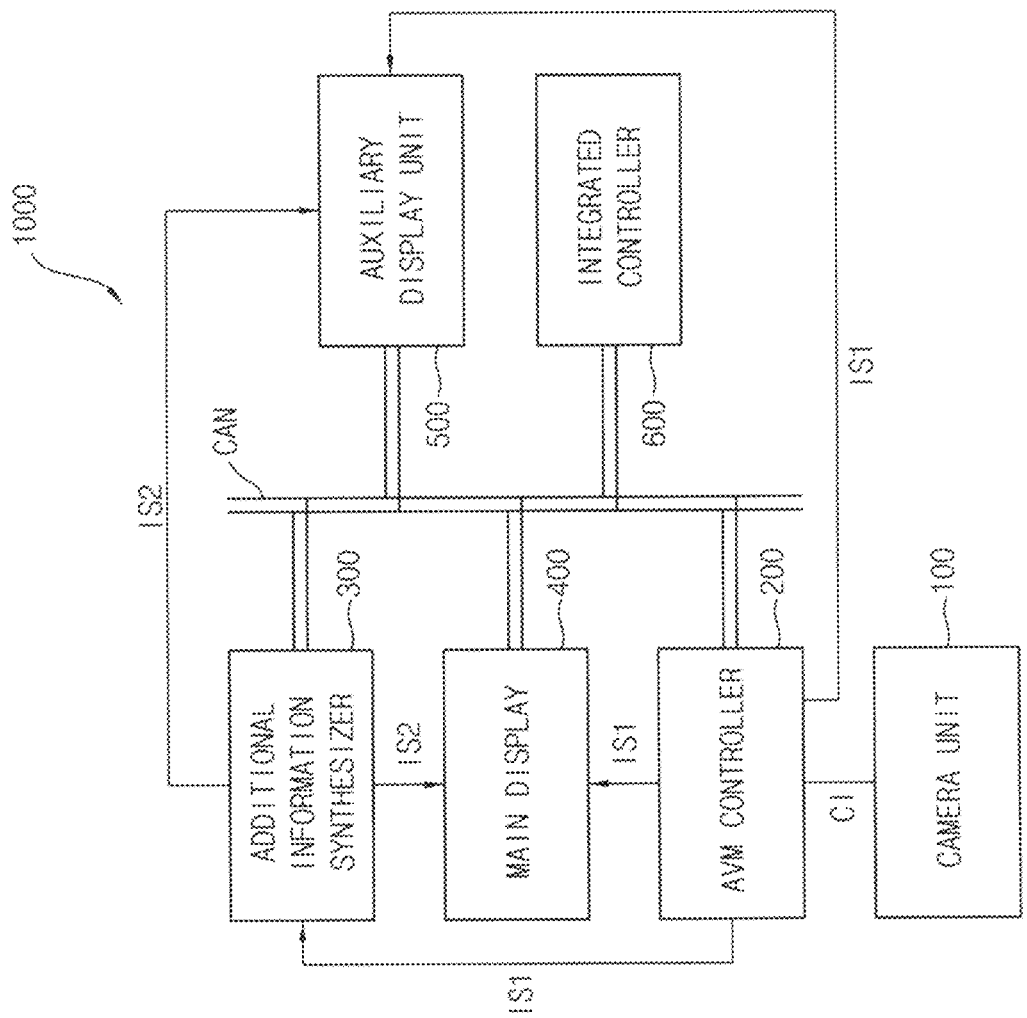
FIG. 1 is a block diagram illustrating a screen display system of construction equipment in accordance with example embodiments.

Hereinafter, preferable embodiments of the present invention will be explained with reference to the attached drawings. Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferable embodiments of the present invention will be explained in detail with reference to the accompanying drawings.

FIG. 1 is a block diagram illustrating a screen display system of construction equipment in accordance with example embodiments.

Referring to FIG. 1, a screen display system of construction equipment 1000 may include a camera unit 100, an AVM controller 200, an additional information synthesizer 300, a main display 400, an auxiliary display 500, and an integrated controller 600.

The camera unit 100 may include a plurality of cameras which generate camera image data (CI). For example, the camera unit 100 may include a plurality of the cameras for grasping conditions about a forward looking view, a backward looking view and left and right side forward looking views of the construction equipment. Each of the cameras of the camera unit 100 may capture images to generate the camera image data (CI).

The AVM controller 200 may generate an AVM (Around View Monitor) image data based on the camera image data (CI), and may select the AVM image data or the camera image data (CI) as first image data (IS1) based on a first failure flag. In here, the AVM image data may represent an image that is obtained by synthesizing or processing at least one camera image data (CI), in order for a user to easily grasp the conditions about the forward looking view, the backward looking view and the left and right side forward looking views of the construction equipment. The AVM controller 200 may output the AVM image data or the camera image data (CI) according to the first failure flag which represents whether or not a failure occurs in the AVM controller 200. In some embodiments, the AVM controller 200 may select the AVM image data as the first image data (IS1) when the first failure flag represents a normal state, and may select at least one of the camera image data (CI) as the first image data (IS1) when the first failure flag represents a failure state.

Additionally, the AVM controller 200 may provide the additional information synthesizer 300 with the first image data (IS1) when the additional information synthesizer 300 operates in a normal state. On the other hand, the AVM controller 200 may provide the main display 400 or the auxiliary display 500 with the first image data (IS1) when a failure occurs in the additional information synthesizer 300. A configuration and operation of the AVM controller 200 will be explained in detail with reference to FIGS. 2, 10 and 12.

The additional information synthesizer 300 may output a second image data (IS2) which is generated based on the first image data (IS1). In some embodiments, the auxiliary synthesizer 300 may process the first image data (IS1) such that a user interface including auxiliary information is added to the first image data (IS1), to generate the second image data (IS2). For example, the additional information synthesizer 300 may add information such as entertainment-related information, user terminal information, etc, to the first image data (IS1) to generate the second image data (IS2). The additional information synthesizer 300 may perform various functions including the function of generating the second image data (IS2). In some embodiments, the additional information synthesizer 300 may include a gateway which performs a communication control function of Serial Bus (CAN). In case that the additional information synthesizer 300 has a configuration of the gateway, the additional information synthesizer 300 may perform a communication control function for reducing communication load of the integrated controller 600. Further, the additional information synthesizer 300 may be constituted integrally with the AVM controller 200 and the integrated controller 600. That is, the AVM controller 200 or the integrated controller 600 may perform the function of generating the second image data (IS2) with their own original functions.

The main display 400 may receive the first image data (IS1) and the second image data (IS2) and may display an image corresponding one based on a second failure flag representing whether or not a failure occurs in the additional information synthesizer 300. In here, the main display 400 may be a display device that displays an image obtained by a camera in a normal mode or an image obtained by processing the image of the normal mode. In some embodiments, the main display 400 may display the image corresponding to the first image data (IS1) when the second failure flag represents a failure state, and may display the image corresponding to the second image data (IS2) when the second failure flag represents a normal state. That is, when the second image data (IS2) is not generated normally due to the failure occurring in the additional information synthesizer 300, the main display 400 may display the image corresponding to the first image data (IS1). On the other hand, when the additional information synthesizer 300 generates the second image data (IS2) normally, the main display 400 may display the image corresponding to the second image data (IS2).

The auxiliary display 500 may display an image corresponding to one of the first image data (IS1) and the second image data (IS2) when a third failure flag representing whether or not a failure occurs in the main display 400 represents a failure state. The auxiliary display 500 may display information (for example, image about travel information, warning information, etc) which is not the image captured by the camera in the normal state. In some embodiments, the auxiliary display 500 may display the image corresponding to the first image data (IS1) when the second failure flag represents a failure state, and may display the image corresponding to the second image data (IS2) when the second failure flag represents a normal state.

The integrated controller 600 may control operations of the AVM controller 200, the additional information synthesizer 300, the main display 400 and the auxiliary display 500. For example, the integrated controller 600 may include a pump control device (Electronic Power Optimizing System; EPOS), an engine controller (ECU), various sensors and a setup device to generally control the construction equipment. The integrated controller 600 may monitor states of the AVM controller 200, the additional information synthesizer 300, the main display 400 and the auxiliary display 500, set up a failure flag when a failure occurs and control the operations of the AVM controller 200 and the additional information synthesizer 300. In some embodiments, the integrated controller 600 may be connected to the AVM controller 200, the additional information synthesizer 300, the main display 400 and the auxiliary display 500 via the Serial Bus (CAN), and may transmit control information. For example, the Serial Bus (CAN) may be CAN (Controller Area Network) interface having high integrity for networking intelligent devices.

In some embodiments, the first image data (IS1) and/or the second image data (IS2) may be transmitted by LVDS (Low Voltage Differential Signals). Thus, high speed communications may be possible at low power, and accordingly, image data (IS1, IS2) having relatively high capacity may be supplied stably.

Although it is described herein that the second image data (IS2) is generated in the additional information synthesizer 300, it may not be limited thereto. For example, the second image data (IS2) may be generated in other elements, i.e., AVM controller 200, external image processing device (not illustrated), etc.

Figure 2:
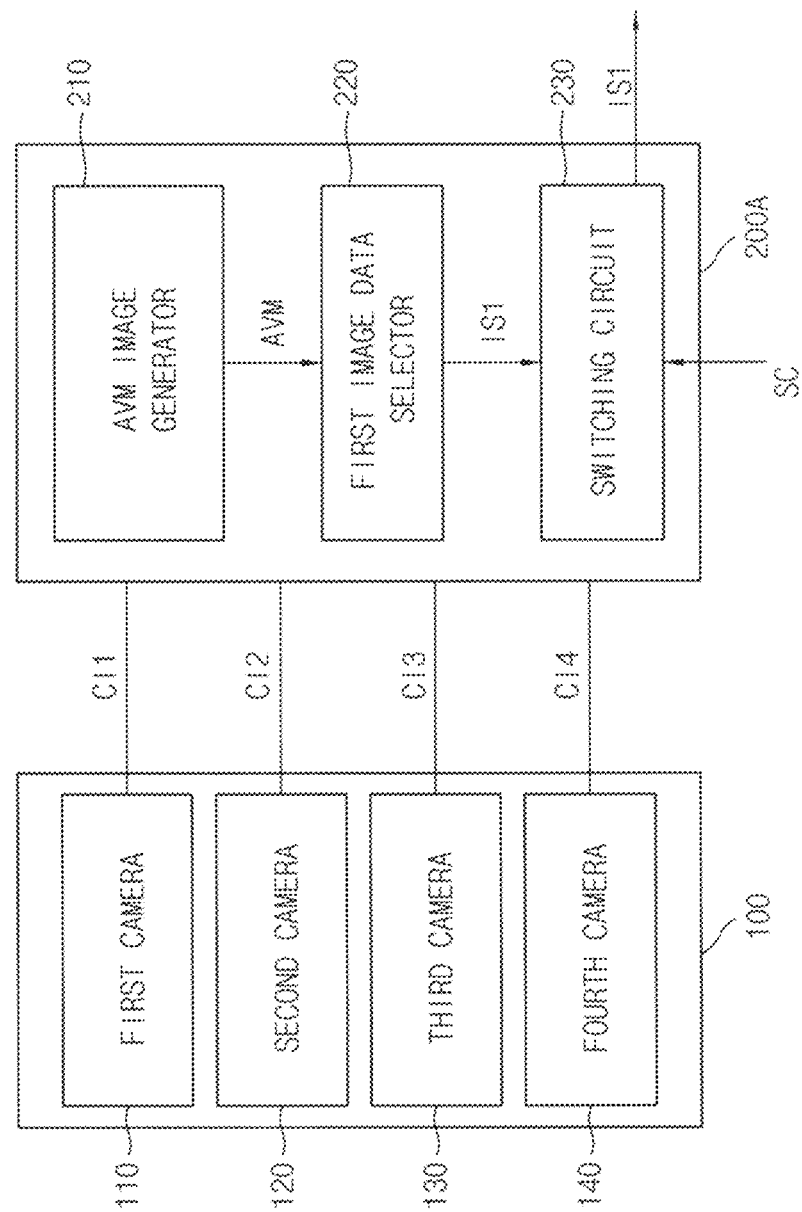
FIG. 2 is a block diagram illustrating the camera unit and the AVM controller included in the screen display system of construction equipment in FIG. 1.
Figure 3:
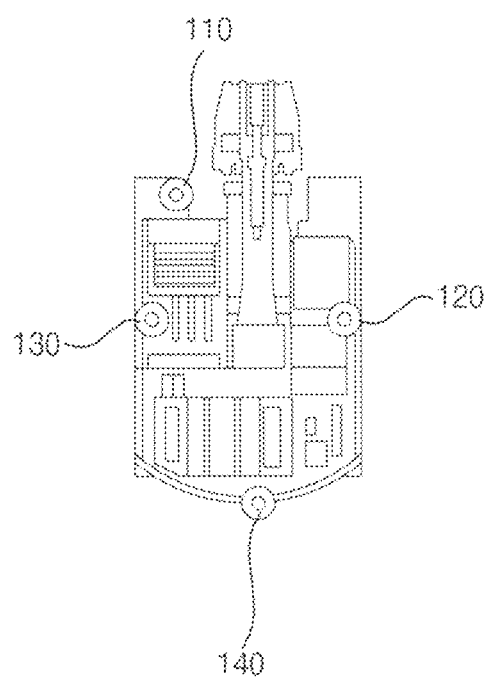
FIG. 3 is a view illustrating the construction equipment including cameras of the camera unit in FIG. 2 installed therein.

FIG. 2 is a block diagram illustrating the camera unit and the AVM controller included in the screen display system of construction equipment in FIG. 1. FIG. 3 is a view illustrating the construction equipment including cameras of the camera unit in FIG. 2 installed therein.

Referring to FIGS. 2 and 3, a camera unit 100 may include first to fourth cameras 110, 120, 130, 140. The first to fourth cameras 110, 120, 130, 140 of the camera unit 100 may photograph the forward looking view, the backward looking view and the left and right forward looking views of the construction equipment. In some embodiments, as illustrated in FIG. 3, the first camera 110 may be arranged in the front of the construction equipment and may photograph the forward looking view of the construction equipment to generate first camera image data (CI1). The second camera 120 may be arranged in the right side of the construction equipment and may photograph the right side forward looking view of the construction equipment to generate second camera image data (CI2). The third camera 130 may be arranged in the left side of the construction equipment and may photograph the left side forward looking view of the construction equipment to generate third camera image data (CI3). The fourth camera 140 may be arranged in the rear side of the construction equipment and may photograph the backward looking view of the construction equipment to generate fourth camera image data (CI4).

An AVM controller 200A may include an AVM image generator 210, a first image data selector 220, and a switching circuit 230.

The AVM image generator 210 may generate AVM image data (AVM) based on the first to fourth camera image data (CI1 to CI4). In some embodiments, the AVM image generator 210 may synthesize the first to fourth camera image data (CI1 to CI4) to generate the AVM image data (AVM) which corresponds to a top view image providing a 360-degree scene of the construction equipment in bird's-eye view. In other embodiments, the AVM image generator 210 may provide an enlarged image, a partial image, a synthetic image, etc. of the first to fourth camera image data (CI1 to CI4) based on a motion of the construction equipment.

The first image data selector 220 may select at least one of the AVM image data (AVM) and the camera image data (CI1 to CI4) as a first image data (IS1) based on a first failure flag. In here, the first failure flag may be preset by performing failure monitoring on the AVM image generator 210 or the camera unit 100 inside the screen display system, or may be determined through a physical switch manipulated by a user. In some embodiments, the first image data selector 220 may select the AVM image data (AVM) as the first image data (IS1) when the first failure flag represents a normal state. On the other hand, the first image data selector 220 may select at least one of the first to fourth camera image data (CI1 to CI4) as the first image data (IS1) when the first failure flag represents a failure state. That is, the first image data selector 220 may output the AVM image data (AVM) as the first image data (IS1) when the AVM image data (AVM) is generated normally in the AVM image generator 210 (that is, normal mode). On the other hand, the first image data selector 220 may output one of the first to fourth camera image data (CI1 to CI4) as the first image data (IS1) when the AVM image data (AVM) is not generated normally due to the failure occurring in the AVM image generator 210. In some embodiments, the first image data selector 220 may output the fourth camera image data (CI4) corresponding to the backward looking view of the construction equipment as the first image data (IS1) when the AVM image data (AVM) is not generated normally. In other embodiments, the first image data selector 220 may output the camera image data of the first to fourth camera image data (CI1 to CI4) received from the camera which photographs a view opposite to a work direction of the construction equipment, as the first image data (IS1).

The switching circuit 230 may determine which of the additional information synthesizer, the main display and the auxiliary display is provided with the first image data (IS1). In some embodiments, the switching circuit may determine which of the units is provided with the first image data (IS1), based on at least one of a first failure flag, a second failure flag and a third failure flag. For example, the switching circuit 230 may receive a control signal (SC) including the first failure flag representing a failure state of the AVM image unit 210, the second failure flag representing a failure state of the additional information synthesizer and the third failure flag representing a failure state of the main display, and may determine whether or not to provide the first image data (IS1) to each of the additional information synthesizer, the main display and the auxiliary display based on the states of the first failure flag, the second failure flag and the third failure flag. Operations according to the states of the first to third failure flags will be explained in detail with reference to FIGS. 8 and 9.

Figure 4:
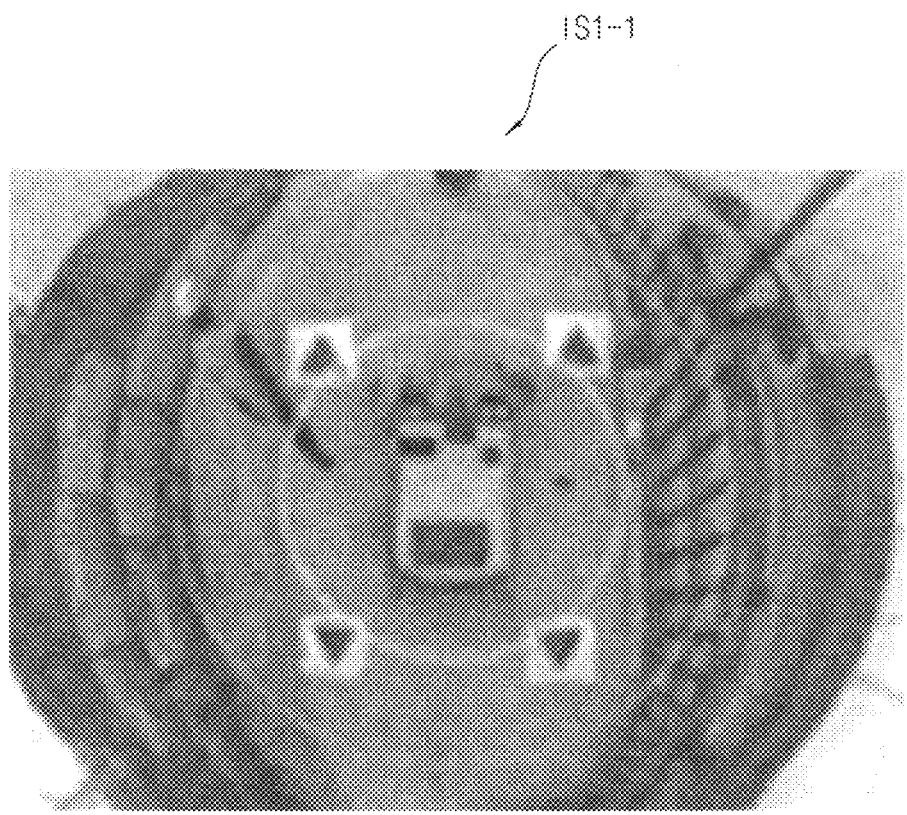
FIG. 4 is a view illustrating an example of the first image data outputted from the AVM controller in FIG. 1.
Figure 5:
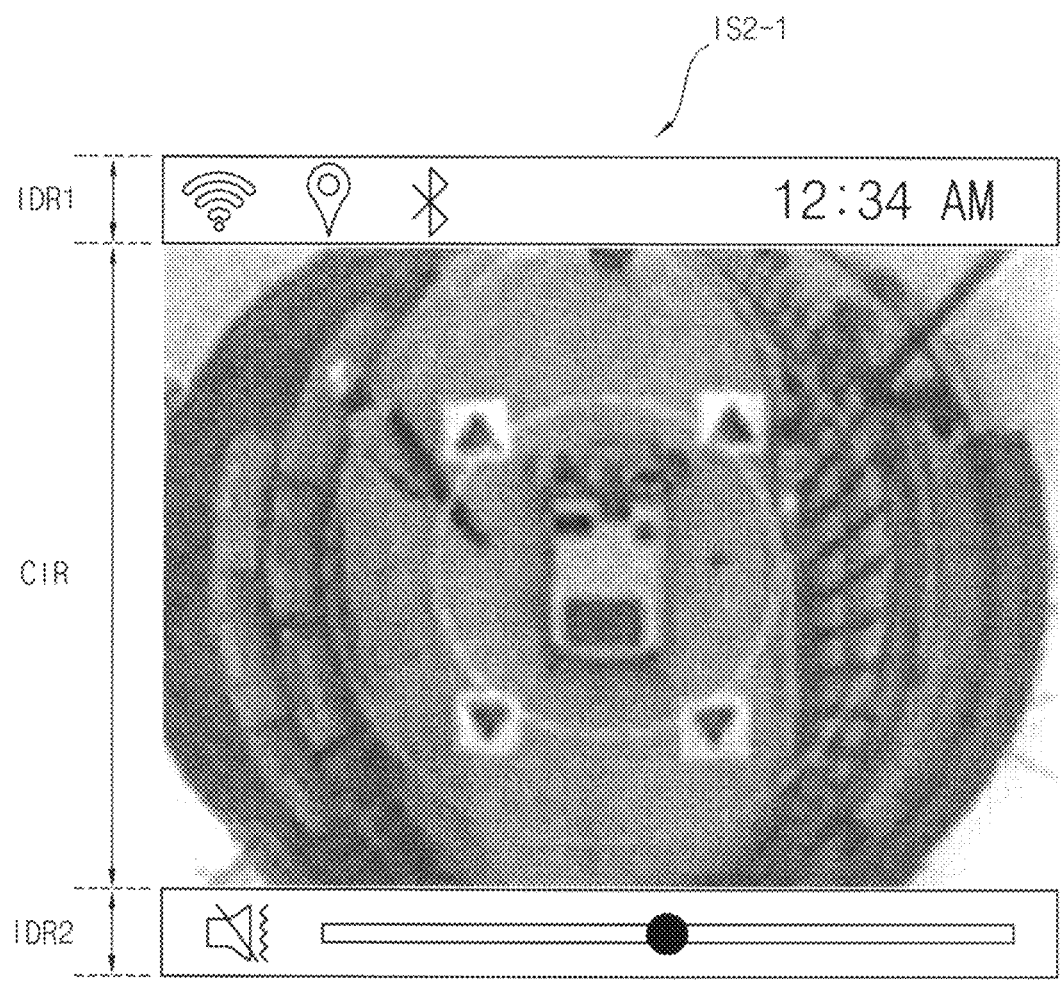
FIG. 5 is a view illustrating an example of the second image data generated in the additional information synthesizer based on the first image data in FIG. 4.

FIG. 4 is a view illustrating an example of the first image data outputted from the AVM controller in FIG. 1. FIG. 5 is a view illustrating an example of the second image data generated in the additional information synthesizer based on the first image data in FIG. 4.

Referring to FIGS. 4 and 5, when the AVM controller generates the AVM image data normally, the AVM image data may be outputted as the first image data (IS1-1).

As illustrated in FIG. 4, when the AVM controller generates the AVM image data normally (that is, in case that the first failure flag represents a normal state), the AVM controller may synthesize camera image data photographed from all sides of the construction equipment to output the AVM image data which corresponds to the top view of the construction equipment, as the first image data (IS1-1).

As illustrated in FIG. 5, when the second failure flag represents a normal state, the additional information synthesizer may generate normally the second image data (IS2-1) by processing the first image data (IS1-1) which corresponds to the top view. For example, an image of the second image data (IS2-1) may include a camera image region (CIR), a first information region (IDR1) and a second information region (IDR2). An image corresponding to the first image data (IS1-1) generated in the AVM controller may be displayed in the camera image region (CIR). An image including information received from a user terminal (for example, user's smart phone) such as network connection information, GPS connection information, Bluetooth connection information, time information, etc. may be displayed in the first information region (IDR1). An image including entertainment-related information such as sound volume information, audio reproduction information, etc. may be displayed in the second information region (IDR2).

Figure 6:
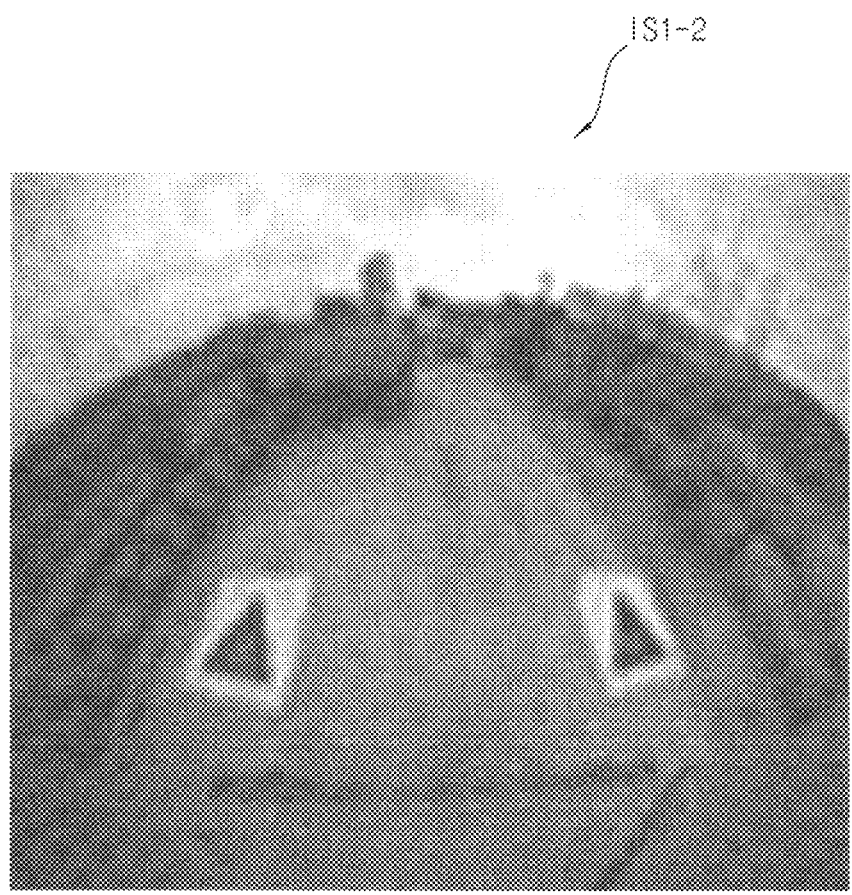
FIG. 6 is a view illustrating another example of the first image data outputted from the AVM controller in FIG. 1.
Figure 7:
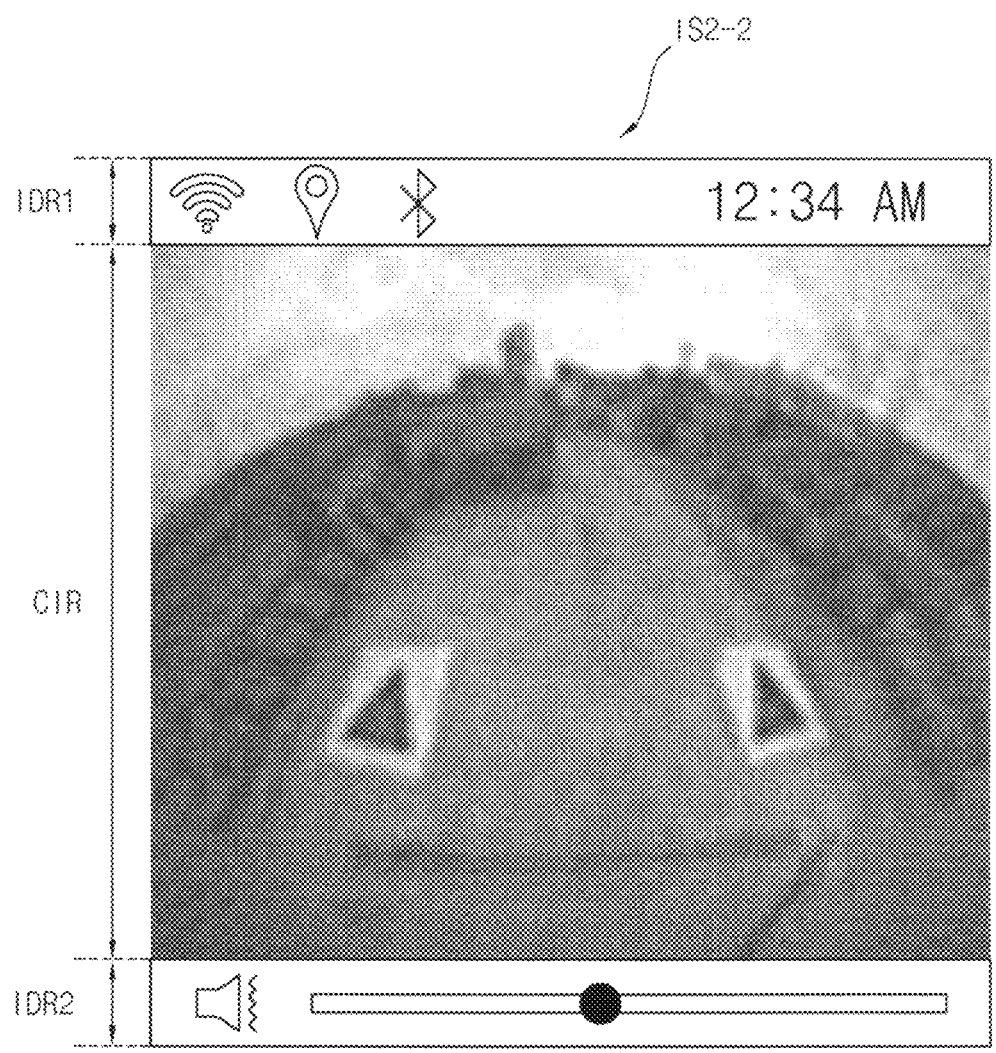
FIG. 7 is a view illustrating an example of the second image data generated in the additional information synthesizer based on the first image data in FIG. 6.

FIG. 6 is a view illustrating another example of the first image data outputted from the AVM controller in FIG. 1. FIG. 7 is a view illustrating an example of the second image data generated in the additional information synthesizer based on the first image data in FIG. 6.

Referring to FIGS. 6 and 7, when the AVM image data (AVM) is not generated normally in the AVM controller, at least one of the camera image data (CI) may be outputted as the first image data.

As illustrated in FIG. 6, when the AVM controller cannot generates the AVM image data normally (that is, in case that the first failure flag represents a failure state), the AVM controller may output the camera image data which is photographed in the rear of the construction equipment, as the first image data (IS1-2).

As illustrated in FIG. 7, when the second failure flag represents a failure state, the additional information synthesizer may generate the second image data (IS2-2) by processing the first image data (IS1-2) which corresponds to the backward looking view. In this case, an image corresponding to the first image data (IS1-2) which is obtained from the camera image data photographed in the rear of the construction equipment may be displayed in the camera image region (CIR).

Figure 8:
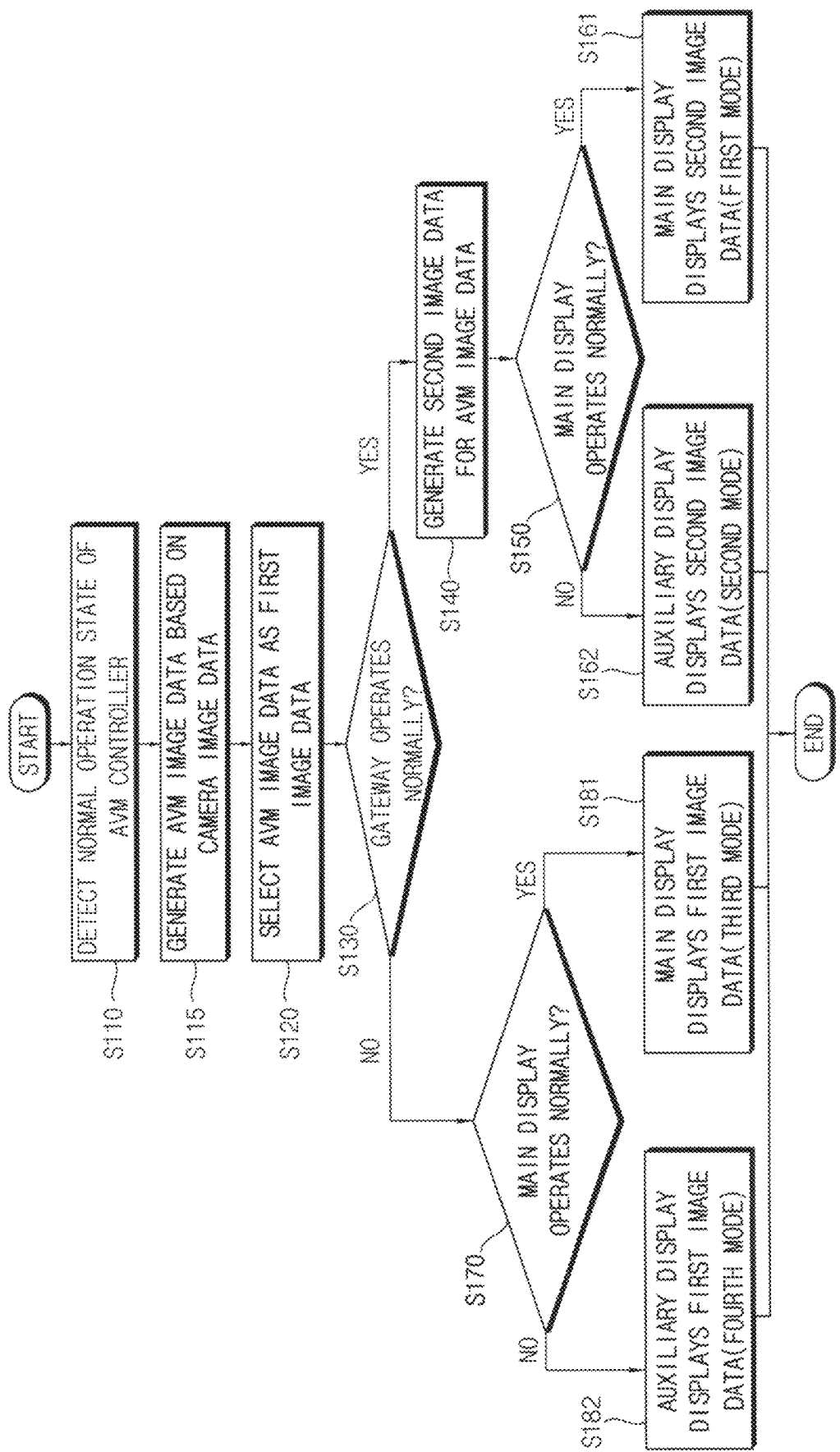
FIGS. 8 and 9 are flow charts illustrating a screen display method performed by the screen display system of the construction equipment in FIG. 1.
Figure 9:
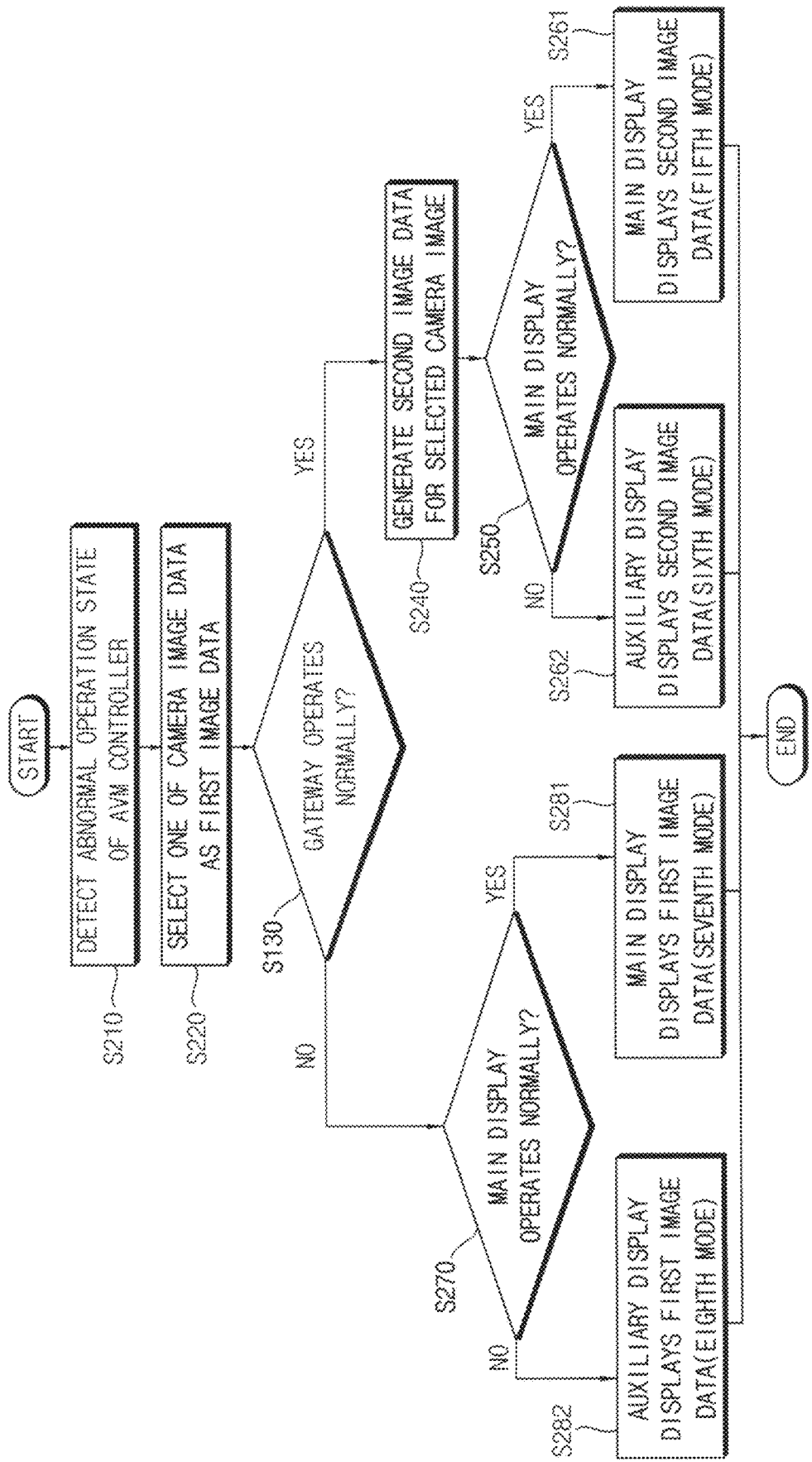

FIGS. 8 and 9 are flow charts illustrating a screen display method performed by the screen display system of the construction equipment in FIG. 1.

Referring to FIGS. 8 and 9, steps of processing camera image may be determined depending on whether or not each of an AVM controller, an additional information synthesizer and a main display operates normally and then an image may be displayed.

As illustrated in FIG. 8, according to a screen display method of construction equipment, in case that the AVM controller generates AVM image data normally, an image may be displayed based on the AVM image data.

In particular, a normal operation state of the AVM controller may be detected (S110). The AVM controller may generate AVM image data based on camera image data (S115), and may select the AVM image data as a first image data (S120). For example, when a first failure flag controlled by an integrated controller represents a normal state of the AVM controller, it may be determined that the AVM controller generates the AVM image data normally. Accordingly, the AVM controller may receive camera image data from a plurality of cameras, and may output the AVM image data such as a top view image as the first image data.

Whether or not the additional information synthesizer operates normally may be detected (S130). For example, whether or not the additional information synthesizer operates normally may be determined based on the second failure flag representing whether or not a failure occurs in the additional information synthesizer, and the output image data may be determined as one of the first image data and the second image data.

In case that the additional information synthesizer operates normally, the additional information synthesizer may generate the second image data based on the first image data (S140). For example, in case that the second failure flag corresponds to a normal state of the additional information unit, the switching circuit of the AVM controller may determine the output image data as the second image data because it is determined that the additional information unit can generate normally the second image data, and may provide the additional information synthesizer with the first image data for generating the second image data.

Whether or not the main display operates normally may be detected (S150). For example, whether or not the main display operates normally may be determined based on the third failure flag representing whether or not a failure occurs in the main display. In case that the main display operates normally, the additional information synthesizer may provide the main display with the second image data, and the main display may display an image corresponding to the second image data (that is, operate in a first mode) (S161). In the first mode, since the AVM controller, the additional information synthesizer and the main display operate normally, the AVM controller may generate the AVM image data based on the camera image data obtained by cameras and may provide the additional information synthesizer with the AVM image data as the first image data, the additional information synthesizer may generate the second image data based on the AVM image data and may provide the main display, and then, the main display may display the second image data.

On the other hand, in case that the main display does not operates normally, the additional information synthesizer may provide the auxiliary display with the second image data, and then, the auxiliary display may display the image corresponding to the second image data (that is, operate in a second mode) (S162). In the second mode, since the AVM controller and the additional information synthesizer operate normally but the main display does not operate normally, the AVM controller may generate the AVM image data based on the camera image data obtained by cameras and may provide the additional information synthesizer with the AVM image data as the first image data, the additional information synthesizer may generate the second image data based on the AVM image data and may provide the auxiliary display, and then, the auxiliary display may display the second image data.

Meanwhile, in case that the second failure flag representing whether or not a failure occurs in the additional information synthesizer corresponds to a failure state of the additional information unit, the switching circuit of the AVM controller may determine the output image data as the first image data because it is determined that the additional information unit cannot generate normally the second image data.

Whether or not the main display operates normally may be detected (S170). In case that the main display operates normally, the AVM controller may provide the main display with the first image data, and the main display may display an image corresponding to the first image data (that is, operate in a third mode) (S181). In the third mode, since the AVM controller and the main display operate normally but the additional information synthesizer does not operate normally, the AVM controller may generate the AVM image data based on the camera image data obtained by cameras and may provide the main display with the AVM image data as the first image data, and then, the main display may display the first image data.

On the other hand, in case that the main display does not operates normally, the AVM controller may provide the auxiliary display with the first image data, and then, the auxiliary display may display the image corresponding to the first image data (that is, operate in a fourth mode) (S182). In the fourth mode, since the AVM controller operates normally but the additional information synthesizer and the main display do not operate normally, the AVM controller may generate the AVM image data based on the camera image data obtained by cameras and may provide the auxiliary display with the AVM image data as the first image data, and then, the auxiliary display may display the first image data.

As illustrated in FIG. 9, according to a screen display method of construction equipment, in case that the AVM controller cannot generate AVM image data normally, an image may be displayed based on the first image data which is selected from camera image data.

In particular, an abnormal operation state of the AVM controller may be detected (S210). One of the camera image data may be selected as the first image data. For example, when a first failure flag controlled by an integrated controller represents a failure state of the AVM controller, it may be determined that the AVM controller cannot generate the AVM image data normally. Accordingly, the switching circuit of the AVM controller may receive camera image data from a plurality of cameras, and may output one of the AVM image data as the first image data.

Whether or not the additional information synthesizer operates normally may be detected (S230), and in case that the additional information synthesizer operates normally, the additional information synthesizer may generate the second image data based on the first image data (S240). For example, in case that the second failure flag representing whether or not a failure occurs in the additional information synthesizer corresponds to a normal state of the additional information unit, the switching circuit of the AVM controller may determine the output image data as the second image data because it is determined that the additional information unit can generate normally the second image data, and may provide the additional information synthesizer with the first image data for generating the second image data.

Whether or not the main display operates normally may be detected (S250). In case that the main display operates normally, the additional information synthesizer may provide the main display with the second image data, and the main display may display an image corresponding to the second image data (that is, operate in a fifth mode) (S261). In the fifth mode, since the additional information synthesizer and the main display operate normally but the AVM controller does not operate normally, the switching circuit provide the additional information synthesizer with one of the camera image data obtained by cameras as the first image data, the additional information synthesizer may generate the second image data based on one of the camera image data and may provide the main display, and then, the main display may display the second image data.

On the other hand, in case that the main display does not operates normally, the additional information synthesizer may provide the auxiliary display with the second image data, and then, the auxiliary display may display the image corresponding to the second image data (that is, operate in a sixth mode) (S262). In the sixth mode, since the additional information synthesizer operates normally but the AVM controller and the main display do not operate normally, the switching circuit may provide the additional information synthesizer with one of the camera image data obtained by cameras as the first image data, the additional information synthesizer may generate the second image data based on the first image data and may provide the auxiliary display, and then, the auxiliary display may display the second image data.

Meanwhile, in case that the second failure flag representing whether or not a failure occurs in the additional information synthesizer corresponds to a failure state of the additional information unit, the switching circuit of the AVM controller may determine the output image data as the first image data because it is determined that the additional information unit cannot generate normally the second image data.

Whether or not the main display operates normally may be detected (S270). In case that the main display operates normally, the switching circuit may provide the main display with one of the camera image data as the first image data, and the main display may display an image corresponding to the first image data (that is, operate in a seventh mode) (S281). In the seventh mode, since the main display operates normally but the AVM controller and the additional information synthesizer does not operate normally, the switching circuit may provide the main display with one of the camera image data obtained by cameras as the first image data, and then, the main display may display the first image data.

On the other hand, in case that the main display does not operates normally, the switching circuit may provide the auxiliary display with one of the camera image data as the first image data, and then, the auxiliary display may display the image corresponding to the first image data (that is, operate in a eighth mode) (S282). In the eighth mode, since the AVM controller, the additional information synthesizer and the main display do not operate normally, the switching circuit may provide the auxiliary display with one of the camera image data obtained by cameras as the first image data, and then, the auxiliary display may display the first image data.

Figure 10:
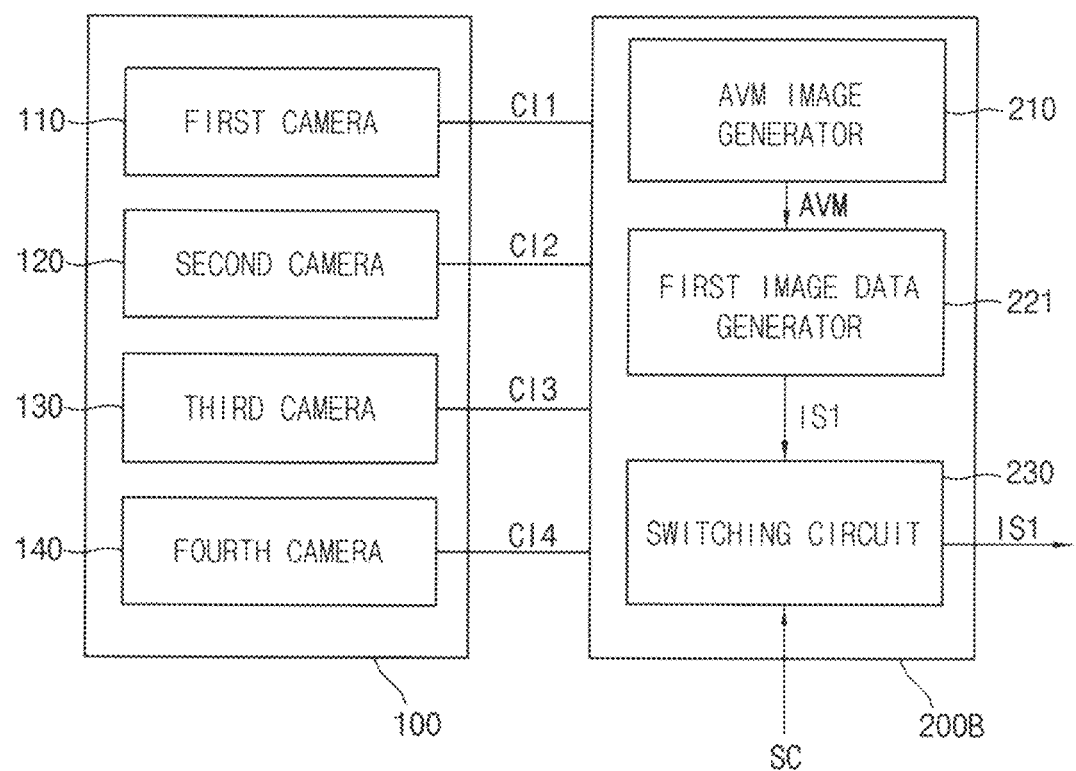
FIG. 10 is a block diagram illustrating another example of the camera unit and the AVM controller included in the screen display system of construction equipment in FIG. 1.

FIG. 10 is a block diagram illustrating another example of the camera unit and the AVM controller included in the screen display system of construction equipment in FIG. 1.

Figure 11:
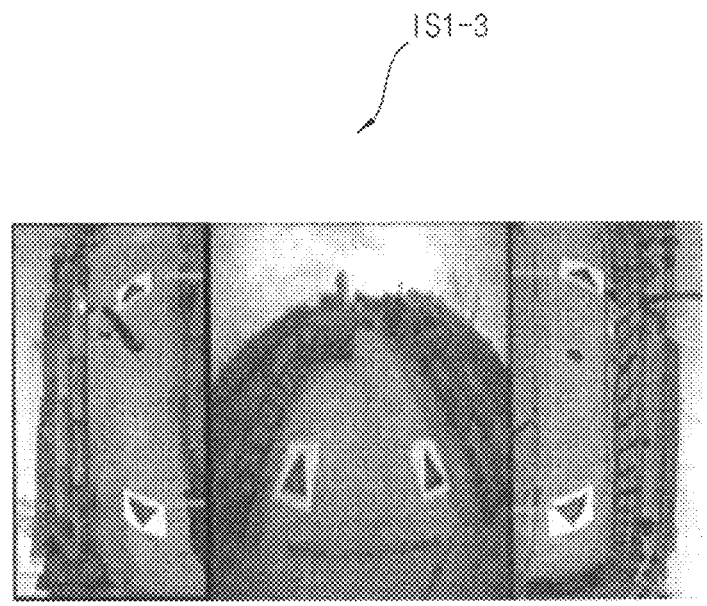
FIG. 11 is a view illustrating an example of the first image data outputted from the AVM controller in FIG. 10.

FIG. 11 is a view illustrating an example of the first image data outputted from the AVM controller in FIG. 10.

Referring to FIGS. 10 and 11, a camera unit 100 may include first to fourth cameras 110, 120, 130, 140, and an AVM controller 200B may include an AVM image generator 210, a first image data generator 221, and a switching circuit 230. The present AVM controller 200B may be substantially the same as or similar to the AVM controller 200A described with reference to FIG. 2 except that the first image data generator 221 is provided instead of the first image data selector 221. Thus, same reference numerals will be used to refer to the same or like elements and any further repetitive explanation concerning the above elements will be omitted.

The AVM image generator 210 may generate AVM image data (AVM) based on the first to fourth camera image data (CI1 to CI4).

The first image data generator 221 may generate a first image data (IS1) based on the AVM image data (AVM) or the camera image data (CI1 to CI4). In some embodiments, the first image data generator 221 may determine the AVM image data (AVM) as the first image data (IS1) when the first failure flag represents a normal state. The first image data generator 221 may merge at least two of the camera image data (CI1 to CI4) to generate the first image data (IS1) when the first failure flag represents a failure state. For example, as illustrated in FIG. 11, the first image data generator 221 may merge the second to fourth camera image data (CI2 to CI4) corresponding to the left side forward looking view, the right side forward looking view and the backward looking view to generate the first image data (IS1-3).

The switching circuit 230 may determine which of the additional information synthesizer, the main display and the auxiliary display is provided with the first image data.

Figure 12:
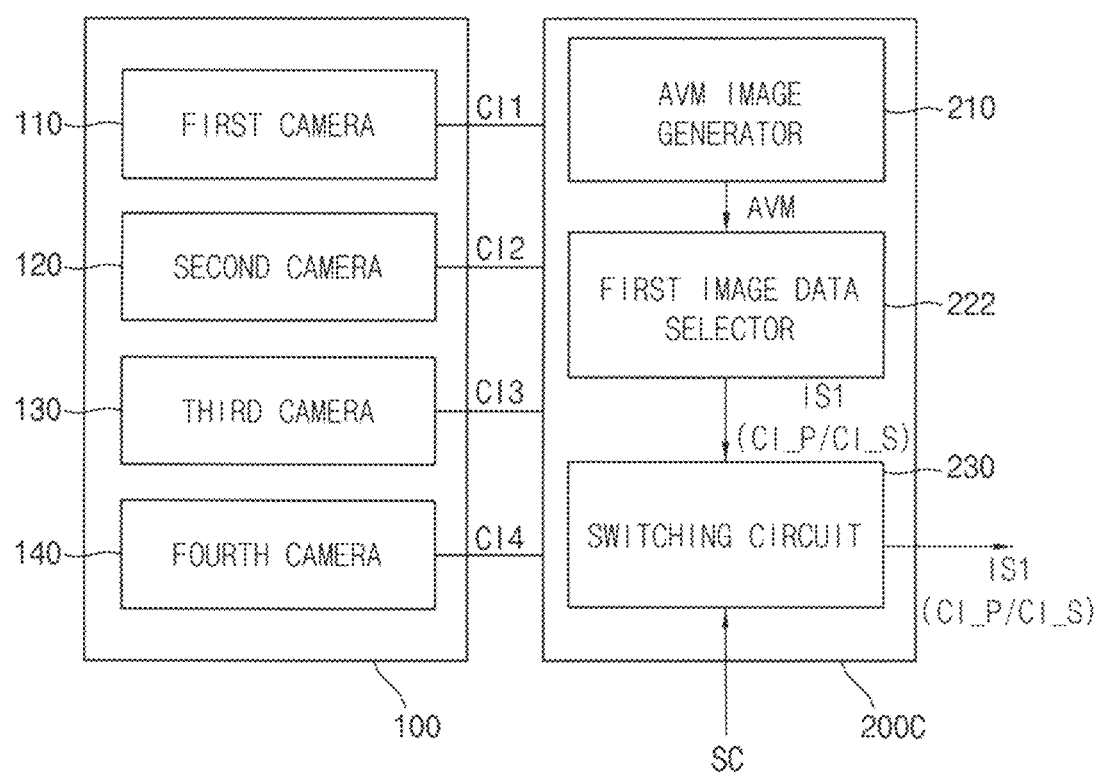
FIG. 12 is a block diagram illustrating another example of the camera unit and the AVM controller included in the screen display system of construction equipment in FIG. 1.
Figure 13:
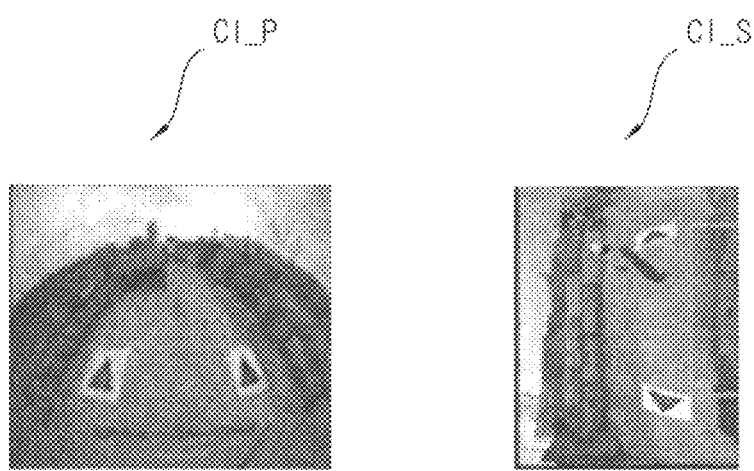
FIG. 13 is a view illustrating an example of the first image data outputted from the AVM controller in FIG. 12.

FIG. 12 is a block diagram illustrating another example of the camera unit and the AVM controller included in the screen display system of construction equipment in FIG. 1. FIG. 13 is a view illustrating an example of the first image data outputted from the AVM controller in FIG. 12.

Referring to FIGS. 12 and 13, a camera unit 100 may include first to fourth cameras 110, 120, 130, 140, and an AVM controller 200C may include an AVM image generator 210, a first image data selector 222, and a switching circuit 230. The present AVM controller 200C may be substantially the same as or similar to the AVM controller 200A described with reference to FIG. 2 except that the first image data selector 222 selects the first image data including main camera data (CI_P) and auxiliary camera data (CI-S) in case that a failure occurs in the AVM image generator. Thus, same reference numerals will be used to refer to the same or like elements and any further repetitive explanation concerning the above elements will be omitted.

The AVM image generator 210 may generate AVM image data (AVM) based on the first to fourth camera image data (CI1 to CI4).

The first image data selector tor 221 may select at least one of the AVM image data (AVM) and the camera image data (CI1 to CI4) based on the first failure flag. The first image data selector 222 may select the AVM image data (AVM) as the first image data (IS1) when the first failure flag represents a normal state. On the other hand, the first image data selector 222 may select main camera image data (CI_P) and auxiliary camera image data (CI_P) of the camera image data (CI1 to CI4) as the first image data (IS1) when the first failure flag represents a failure state. In some embodiments, the first image data selector 222 may determine the main camera image data (CI_P) and the auxiliary camera image data (CI_P) based on a working condition of the construction equipment. For example, as illustrated in FIG. 13, when the construction equipment performs a work in the right side of the construction equipment, the first image data selector 222 may select the fourth camera image data (CI4) corresponding to the backward looking view as the main camera image data (CI_P) and may select the third camera image data (CI3) corresponding to the left side forward looking view as the auxiliary camera image data (CI_S).

The switching circuit 230 may determine which of the additional information synthesizer, the main display and the auxiliary display is provided with the first image data. For example, the switching circuit 230 may provide the main display with the main camera image data (CI_P) as the first image data and may provide the auxiliary display with the auxiliary camera image data (CI_S) as the first image data when the first failure flag represents a failure state and the third failure flag represents a normal state.

Accordingly, even though a failure occurs in the AVM image generator 210, image data on two directions may be provided to the main display and the auxiliary display so that a user can grasp conditions such as rear conditions, lateral conditions, etc., to thereby improve stability in the construction equipment.

Although it is described in FIGS. 2, 10 and 12 that the switching circuit is positioned inside the AVM controller, it may not be limited thereto, and the switching circuit may be positioned outside the AVM controller.

The present invention has been explained with reference to preferable embodiments, however, those skilled in the art may understand that the present invention may be modified or changed without being deviated from the concept and the scope of the present invention disclosed in the following claims.

<The description of the reference numerals>

100: camera unit
210: AVM image generator
230: switching circuit
400: main display
600: integrated controller
1000: screen display system of construction equipment 200: AVM controller
220: first image data selector
300: additional information synthesizer
500: auxiliary display

The invention claimed is:

1. A screen display system of construction equipment, comprising:
   a plurality of cameras generating camera image data;
   an Around View Monitor (AVM) controller configured to generate an AVM image data based on the camera image data and select at least one of the AVM image data and the camera image data as a first image data based on a first failure flag representing whether or not a failure occurs in the AVM controller;
   an additional information synthesizer connected to the AVM controller through a Serial Bus (CAN) and configured to output second image data based on the first image data, wherein the additional information synthesizer is configured to process the first image data such that a user interface including auxiliary information is added to the first image data, to generate the second image data;
   a main display configured to display an image corresponding to one of the first image data and the second image data based on a second failure flag representing whether or not a failure occurs in the additional information synthesizer; and an auxiliary display configured to display an image corresponding to one of the first image data and the second image data when a third failure flag representing whether or not a failure occurs in the main display represents a failure state, wherein the AVM controller is configured to select the AVM image data as the first image data when the first failure flag represents a normal state, and select at least one image of the camera image data as the first image data when the first failure flag represents the failure state, and wherein the main display is configured to display the image corresponding to the first image data when the second failure flag represents the failure state, and display the image corresponding to the second image data when the second failure flag represents the normal state, and wherein the AVM controller comprises a switching circuit, wherein the switching circuit is configured to determine which of the additional information synthesizer, the main display, and the auxiliary display is provided with the first image data based on at least one of the first failure flag, the second failure flag, and the third failure flag.

2. The screen display system of construction equipment of claim 1, wherein the additional information synthesizer comprises a gateway performing a communication control function of the Serial Bus (CAN) through which the AVM controller, the additional information synthesizer, and the main display are connected.

3. The screen display system of construction equipment of claim 1, wherein the auxiliary display is configured to display the image corresponding to the first image data when the second failure flag represents the failure state, and display the image corresponding to the second image data when the second failure flag represents the normal state.

4. The screen display system of construction equipment of claim 1, wherein the AVM controller comprises:
an AVM image generator configured to generate the AVM image data based on the camera image data; and
a first image data selector configured to select at least one of the AVM image data and the camera image data as the first image data based on the first failure flag.

5. The screen display system of construction equipment of claim 4, wherein the first image data selector is configured to select at least one image of the camera image data as the first image data when the first failure flag represents the failure state, and select the AVM image data as the first image data when the first failure flag represents the normal state.

6. The screen display system of construction equipment of claim 5, wherein the first image data selector is configured to select main camera image data and auxiliary camera image data of the camera image data as the first image data when the first failure flag represents the failure state, and
wherein the switching circuit is configured to provide the main display with the main camera image data as the first image data, and provide the auxiliary display with the auxiliary camera image data as the first image data.

7. The screen display system of construction equipment of claim 1, wherein the AVM controller comprises:
an AVM image generator configured to generate the AVM image data based on the camera image data; and
a first image data generator configured to generate the first image data based on at least one of the AVM image data and the camera image data; and wherein the first image data generator is configured to merge at least two images of the camera image data to generate the first image data when the first failure flag represents the failure state, and determine the AVM image data as the first image data when the first failure flag represents the normal state.

8. A screen display method of construction equipment, the method comprising:
receiving camera image data;
generating an AVM image data based on the camera image data in an AVM controller;
selecting and outputting at least one of the AVM image data and the camera image data as a first image data based on a first failure flag representing whether or not a failure occurs in the AVM controller;
generating and outputting second image data, by an additional information synthesizer, based on the first image data, wherein the first image data is processed such that a user interface including auxiliary information is added to the first image data, to generate the second image data;
selecting and outputting one of the first image data and the second image data as an output image data based on a second failure flag representing whether or not a failure occurs in the additional information synthesizer; and
displaying an image corresponding to the outputted image data,
wherein at least one image of the camera image data is selected as the first image data when the first failure flag represents a failure state, and the AVM image data is selected as the first image data when the first failure flag represents a normal state,
wherein the first image data is selected as the outputted image data when the second failure flag represents the failure state, and the second image data is selected as the outputted image data when the second failure flag represents the normal state,
wherein the image corresponding to the outputted image data is displayed in an auxiliary display when a third failure flag representing whether or not a failure occurs in the main display represents the failure state, and is displayed in the main display when the second failure flag represents the normal state,
wherein the AVM controller comprises a switching circuit, wherein the method further comprises determining by the switching circuit, which of the additional information synthesizer, the main display, and the auxiliary display is provided with the first image data based on at least one of the first failure flag, the second failure flag, and the third failure flag.

9. The screen display method of construction equipment of claim 8, wherein the AVM controller generates and outputs at least one image of the camera image data as the first image data when the first failure flag represents the failure state.

10. The screen display method of construction equipment of claim 9, wherein the AVM controller generates at least one image of the camera image data as the first image data such that the image corresponding to the outputted first image data is displayed in the main display, and at least one image of the camera image data which are not included in the first image data is displayed in the auxiliary display.

* * * * *